Sept. 15, 1931. B. B. HAMMOND 1,823,321
CAMERA PLATE HOLDER
Filed Dec. 22, 1927
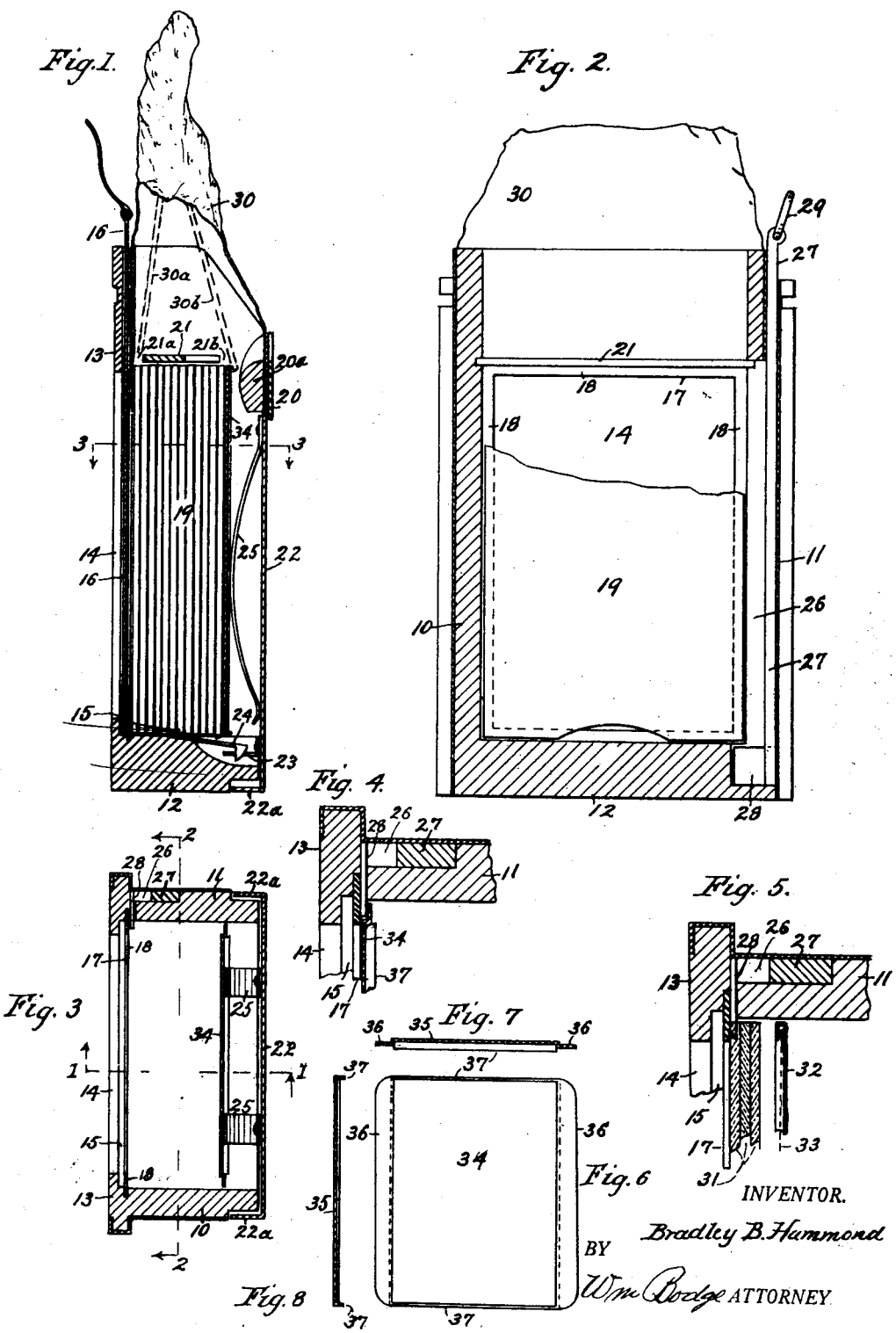

Patented Sept. 15, 1931

1,823,321

UNITED STATES PATENT OFFICE

BRADLEY B. HAMMOND, OF YONKERS, NEW YORK

CAMERA PLATE HOLDER

Application filed December 22, 1927. Serial No. 241,843.

This invention relates to improvements in camera plate holders of the general class in which a plurality of sensitive or film plates are enclosed in a light-proof magazine or box, provided with a flexibly connected bag by means of which successive plates after exposure may be transferred from the front to the back of the magazine and there held as may be desired until all plates have been exposed and are ready for development.

In operating magazines of this class in which exposure of the plates are made at more or less irregular periods, uncertainty frequently occurs in distinguishing between the previously exposed and the unexposed plates, which commonly results in multiple exposure and loss of plate or film occasioned by inadvertently raising the dark slide and allowing the light to pass through the exposure aperture into the plate holder.

The objects of the present invention include means for separating the exposed from the unexposed plates in a manner to avoid multiple exposure; and to provide a guard-plate for this purpose that may be applied to magazines in common use.

For further comprehension of the invention, and of the objects and advantages thereof, reference is had to the following description and accompanying drawings, and to the appended claims in which the various features of the invention are more particularly pointed out.

Referring to the drawings in which similar characters of reference designate like parts throughout the several views:

Figure 1 is a vertical sectional view of my improved device as applied to a conventional plate magazine, the section being taken along the broken line 1—1 of Fig. 3.

Figure 2 is a vertical sectional view taken along the broken line 2—2 of Fig. 3.

Figure 3 is a horizontal sectional view taken along the broken line 3—3 of Fig. 1.

Figs. 4 and 5 are enlarged horizontal sections of corner portions of the box showing the operative connection to the several exposure and guard plates.

Figs. 6, 7 and 8 are side and sectional views of the guard plate.

As shown in the drawings, numerals 10 and 11 designate the side walls of the magazine or box, and 12 and 13 the bottom and front walls respectively. The front wall 13 of the box is provided with an exposure aperture 14 having a groove 15 extending upwardly and outwardly through a top opening in the box to slidingly receive the dark slide 16. Extending inwardly of the groove and forming an interior wall thereof is a rectangular metal frame 17, the inner marginal edges of which are disposed in alinement with the exposure aperture 14, and the inner marginal faces 18 of the frame constitute bearing seats adapted to successively engage in light-proof relation the seat-engaging surfaces of the plates 19. A back plate 20 is provided at upper end of box, and to the inside thereof is fixed a projecting guide wall 20a. Fixed within the box is a top plate 21, one side edge thereof being disposed in spaced relation to the projecting guide wall 20a, and on the opposite side edge, in spaced relation to the front wall 13, the latter spacing comprising a passage-way 21a, and the former a passage-way 21b.

There is also provided for the back of the box, a detachable cover plate or closure 22 for the introduction and removal of the exposure-plates. The cover plate 22 is provided with overlapping flanges 22a that close over the side and bottom walls of the box, the upper edge of the plate extending under and held in closed position by the back plate 20. At its lower end, the cover plate is provided with a catch 23 arranged for engagement by a spring latch 24 adapted to be operated in the usual manner for detachably securing the cover in closed position. A pair of flat bow springs 25 are also secured to the inside of the cover plate and serve in a yielding manner to successively advance the exposure-plates 19 into engagement with the seats 18 of the frame 17 (Fig. 1).

In the side wall 11, the box is provided with a guide-way 26 arranged to slidingly receive the transfer bar 27, the latter having at its lower end a driving lug 28, and at its upper end a grip-ring 29 by means of which the bar may be operated. In its connection to the bar, the lug 28 is disposed to slidingly engage the seat 18 of the aperture frame 17 and in its lowermost position the lug is adapted to successively engage a lower edge of the leading exposure-plate and carry it upwardly into the light-proof flexible bag 30. In their upward movement, these plates are forced through the passageway 21a into the bag, as indicated by the dotted lines 30a, and by the manual manipulation of the bag, are transferred to the position shown by dotted lines 30b, and forced downwardly through the passageway 21b and between the spring 25 and in the rear of the previously exposed plates 19.

As indicated in Figs. 1 and 5, the sensitive or exposure plates comprise those of the usual types, such as indicated at 31 or metal sheaths 32 containing detachable films 33, the latter shown by a dotted line. These conventional plates are substantially of common thickness and provided with square corners, and in their successive advancement and transfer action, as above described, are all of well-known construction and operation, the transfer action of the plates with respect to their engagement by the driving lug 28 being more clearly shown in Figs. 2 and 5, where it is to be noted that the thickness of the latter is substantially less than the thickness of the plates in order to limit each lifting action of the lug to a single plate.

The above described plate-holder is adapted to be connected in conventional manner to a camera-box, not shown, and the dark slide 16 manually operated for opening and closing movements, respectively admitting and intercepting light to and from the holder and controlling the exposure of the sensitive plates.

For preventing double exposure, a guard-plate 34 is positioned in the rear of the sensitive plates as the latter are loaded into the magazine, the guard-plate, as indicated in Figs. 1, 3 and 6, being in its outline and general dimensions similar to the leading sensitive or exposure plates 19. Figs. 7 and 8 show respectively horizontal and vertical cross sections of the guard-plate 34, indicated in side view in Fig. 6. The plate is preferably formed of metal, cut and pressed to the desired shape and consisting of a body portion having on one side a plane face 35, the marginal surfaces thereof being adapted to engage the seats 18 of the frame 17 surrounding the light aperture 14. On opposite vertical side edges, the plate is provided with offset flanges 36 disposed in spaced relation with respect to said marginal surfaces to leave a clear space for the movement of the driving lug 28 of the transfer bar 27, thus rendering the latter inoperative in its movements with respect to the guard-plate, which in turn is held in fixed position against the seats 18 of the frame 17 by the springs 25 acting through the series of previous exposed plates transferred to the back of the magazine. It will thus be obvious that the guard plate will prevent further advancement of the previously exposed plates and will indicate with certainty that all the sensitive plates have been exposed and may be removed for development. Also, in its forward extreme of movement the guard-plate serves to close the light aperture 14 from the inside of the holder and prevent the entrance of light into the magazine and thus act to overcome the possibility of a reexposure on a previously exposed sensitive plate in case the dark slide 16 be accidentally opened.

As herein shown, the guard-plate is also provided at its top and bottom edges with stiffening ribs 37 projecting from the side of the plate opposite the face 35, the free projecting edges of the ribs constituting bearing ledges adapted to engage the seats 18 of the exposure frame 17, the edges of the ribs also projecting outwardly from the flanges 36 to provide a clear space for the idle movements of the driving lug 28, and operating in a similar manner to that described for the reverse side 35 for the prevention of double exposure. Thus, the construction of the guard-plate provides a reversal of position both with respect to the ends and side faces thereof and affords a wide range of convenience in positioning the same with respect to the sensitive plates.

I claim:

1. In a camera plate-holder, means therein for receiving a set of sensitive plates including a guard-plate in the rear thereof, means for advancing said set for successive exposure of the sensitive plates, means including a transfer-bar adapted to replace said exposed plates in the rear of said guard-plate, the said transfer-bar having a driving lug alined with and disposed to engage and successively displace said sensitive plates and disalined with respect to said guard-plate whereby the latter is rejected by the action of the transfer-bar.

2. In a camera plate-holder having a front exposure opening and a back charging passage alined with each other and adapted to receive and discharge a set of exposure plates through said back passage, a guard-plate included in said set and disposed in the rear thereof, means for advancing said set to engage said exposure opening, means including a transfer-bar having a driving-lug and adapted to successively engage and replace said exposed plates in the rear of said guard-plate, the said driving-lug being alined with said exposure plates and disalined with respect to said guard-plate, whereby the latter is inoperative by the movement of said transfer-bar.

3. In a camera plate-holder having an exposure-aperture including a frame having outer and inner closure faces, an outer dark slide engaging the outer closure face, a set of sensitive plates mounted within said holder and yieldingly movable for engagement with said inner closure face, a guard-plate included in said set and disposed in the rear thereof, means including a transfer-bar adapted to successively engage and replace the exposed plates in the rear of said guard-plate, the said transfer-bar having a member alined with the sensitive plates and disalined with said guard-plate, whereby the latter is held inoperative during a movement of said transfer-bar and closes said exposure aperture from the inside of said holder against the admission of light.

Signed at New York in the county of New York and State of New York this 19th day of December, A. D. 1927.

BRADLEY B. HAMMOND.